UNITED STATES PATENT OFFICE.

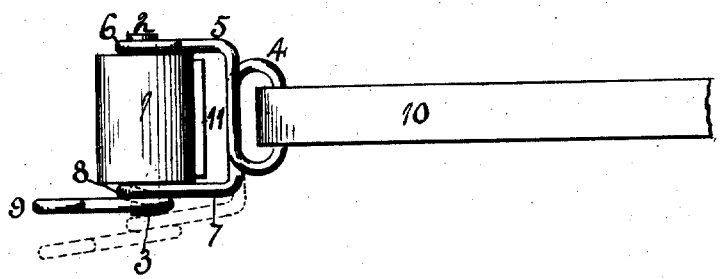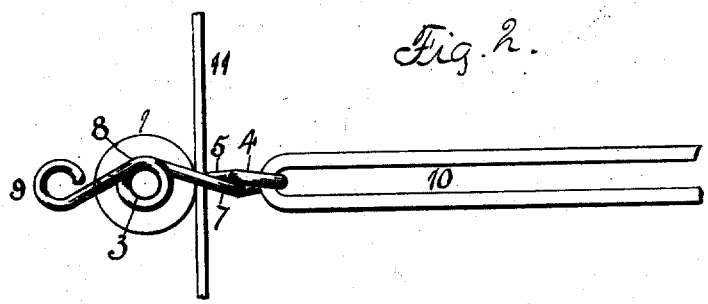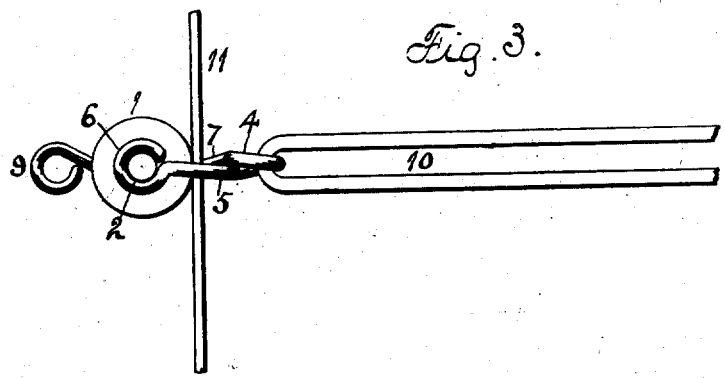

HARRY GRISWOLD AND FRANK G. McALPIN, OF BELOIT, WISCONSIN.

LINE-SPREADER.

SPECIFICATION forming part of Letters Patent No. 689,181, dated December 17, 1901.

Application filed June 6, 1901. Serial No. 63,456. (No model.)

*To all whom it may concern:*

Be it known that we, HARRY GRISWOLD and FRANK G. McALPIN, citizens of the United States, residing at Beloit, in the county of Rock and State of Wisconsin, have invented certain new and useful Improvements in Line-Spreaders, of which the following is a specification.

The object of this invention is to provide a support for a roller of a line-spreader which can be readily removed.

In the accompanying drawings, Figure 1 is a face representation of our improved line-spreader. Fig. 2 is an end elevation. Fig. 3 is an elevation of the end opposite to that shown at Fig. 2.

The line-spreader consists of three parts, a roller, a roller-support, and a strap connecting the roller-support with the harness. The roller 1 has trunnions 2 and 3 extending from its ends. The roller-support is made from spring-wire formed with a central loop 4. The branch 5 is formed with an eye 6, and the branch 7 is formed with an eye 8, from which extends a projection 9. The branches extend at right angles to the loop 4. The trunnion 2 of the roller 1 is placed in the eye 6, and the trunnion 3 is supported by the eye 8. The strap 10 passes through the loop 4 of the roller-support. The ends of the strap have a connection with the harness in the usual manner.

In placing the lines in connection with the spreader the roller is detached from its support by moving the eye 8 into the position shown in dotted lines, Fig. 1, which will free it of the trunnion 3. The line is then placed between the roller and the loop 4 and the roller placed in connection with the eyes 6 and 8. By this means of supporting the roller the line can be easily and quickly placed in connection therewith or disengaged therefrom.

We claim as our invention—

In a line-spreader, the combination of a roller-support formed of spring-wire comprising a central loop formed with eyes, one of the arms extending beyond the eye forming a means for spreading the arms, and a roller provided with trunnions which enter the eyes of the arms, the arms crossed between the central loop and roller.

HARRY GRISWOLD.
FRANK G. McALPIN.

Witnesses:
J. F. RUCH,
AXEL CALIFF.